United States Patent
Martinez

(10) Patent No.: US 7,472,790 B2
(45) Date of Patent: Jan. 6, 2009

(54) OPTICAL DISC COVER

(75) Inventor: Jose G. Martinez, Livermore, CA (US)

(73) Assignee: Marcap, LLC, Roy, UT (US)

( * ) Notice: Subject to any disclaimer, the term of this patent is extended or adjusted under 35 U.S.C. 154(b) by 48 days.

(21) Appl. No.: 11/486,144

(22) Filed: Jul. 13, 2006

(65) Prior Publication Data

US 2008/0011629 A1    Jan. 17, 2008

(51) Int. Cl.
*B65D 85/30* (2006.01)

(52) U.S. Cl. .................. 206/308.1; 206/555; 206/815

(58) Field of Classification Search ............ 206/308.1, 206/232, 310, 312, 449, 445, 555, 493, 804, 206/815

See application file for complete search history.

(56) References Cited

U.S. PATENT DOCUMENTS

| | | | |
|---|---|---|---|
| 5,176,250 A * | 1/1993 | Cheng | 206/748 |
| 5,188,228 A * | 2/1993 | Barrett | 206/308.1 |
| 5,284,243 A * | 2/1994 | Gelardi et al. | 206/308.1 |
| 5,299,186 A | 3/1994 | Tsurushima | |
| 5,322,162 A * | 6/1994 | Melk | 206/310 |
| 5,529,182 A * | 6/1996 | Anderson et al. | 206/308.1 |
| 5,590,767 A * | 1/1997 | Li | 206/308.1 |
| 5,609,249 A * | 3/1997 | Cheng | 206/308.1 |
| 5,651,458 A * | 7/1997 | Brosmith et al. | 206/308.1 |
| 5,757,765 A | 5/1998 | Chen | |
| D408,202 S | 4/1999 | Jacobson | |
| 6,077,583 A | 6/2000 | Park | |
| 6,123,191 A | 9/2000 | Dean | |
| 6,227,363 B1 | 5/2001 | Lu | |
| D447,663 S | 9/2001 | Myszka et al. | |
| 6,568,526 B1 | 5/2003 | Reinhardt et al. | |
| 6,749,061 B2 | 6/2004 | Clausen | |
| D493,300 S | 7/2004 | Pijanowski et al. | |
| 6,860,388 B2 | 3/2005 | Boorman | |
| 6,896,132 B1 | 5/2005 | Frick | |
| 2002/0157975 A1 | 10/2002 | Tsunematsu | |
| 2004/0107432 A1 | 6/2004 | Berkson et al. | |

* cited by examiner

*Primary Examiner*—Jacob K Ackun, Jr.
(74) *Attorney, Agent, or Firm*—Thomas R. Lampe

(57) ABSTRACT

An optical disc is releasably held by a device which covers only one side of the disc. The device and disc are separated by the user simultaneously manually engaging an outer disc rim at two device notch locations and pushing against disc retainer structure of the device.

4 Claims, 2 Drawing Sheets

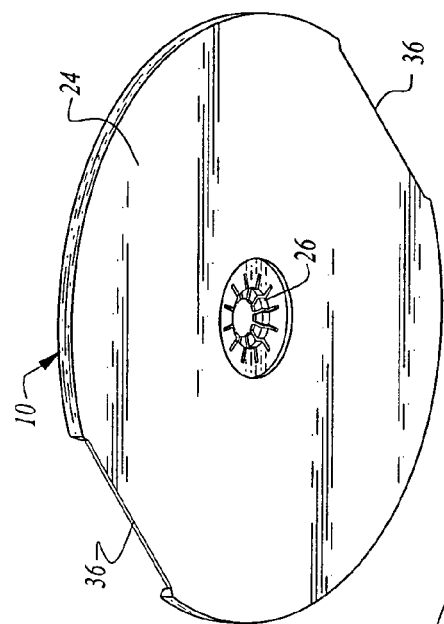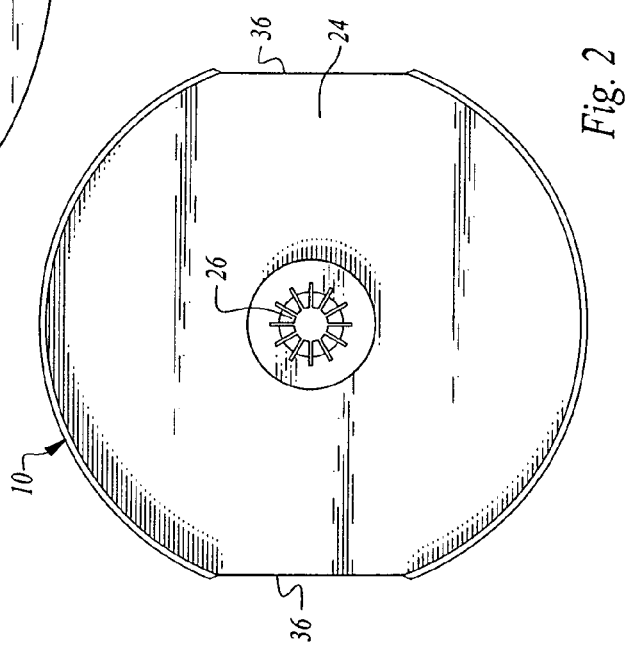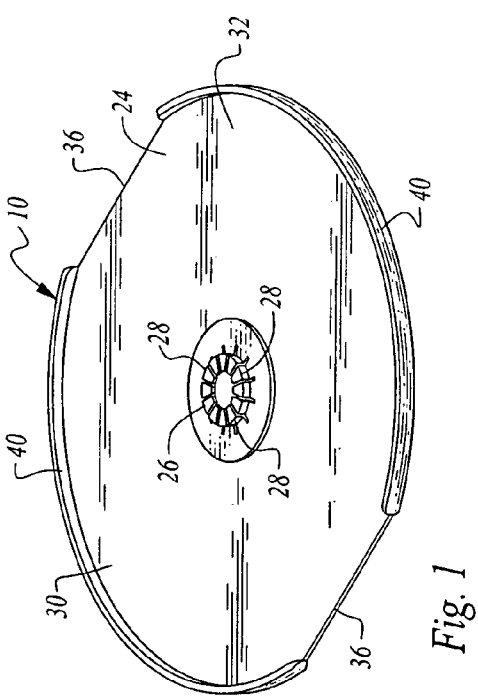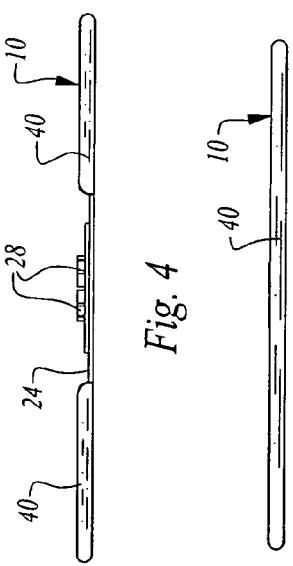

OPTICAL DISC COVER

TECHNICAL FIELD

This invention relates to a device including a cover for protecting optical discs, such as CD's and DVD's. The invention also encompasses a method of utilizing the device with an optical disc.

BACKGROUND OF THE INVENTION

A number of optical disc holders or storage devices are known. Most commonly, CDs and DVDs are made available in retail acrylic boxes, retail cardboard or heavy paper packages, or employed with after market sleeve cases. These approaches have a number of deficiencies including relatively high expense and complexity. Considerable effort often must be expended by a user to remove a disc for playing. Furthermore, some of these devices are prone to breakage and take up considerable storage space.

A number of less conventional holders for compact discs, DVDs and the like also exist for the purpose of affording disc protection and for holding a disc. The following patents and patent application publications disclose less conventional optical disc holders and containers believed to be representative of the current state of the prior art in this field: U.S. Patent Application Pub. No. US 2004/0107432, pub. date Jun. 3, 2004, U.S. Pat. No. 6,860,388, issued Mar. 1, 2005, U.S. Pat. No. 6,123,191, issued Sep. 26, 2000, U.S. Pat. No. 5,299,186, issued Mar. 29, 1994, U.S. Patent Application Pub. No. U.S.2002/0157975, pub. date Oct. 31, 2002, U.S. Pat. No. 6,568,526, issued May 27, 2003, U.S. Pat. No. 6,077,583, issued Jun. 20, 2000, U.S. Pat. No. 6,227,363, issued May 8, 2001, U.S. Pat. No. 6,749,061, issued Jun. 15, 2004, U.S. Pat. No. 6,896,132, issued May 24, 2005, U.S. Pat. No. 5,757,765, issued May 26, 1998, U.S. Design Pat. No. D447,663, issued Sep. 11, 2001, U.S. Design Pat. No. D408,202, issued Apr. 20, 1999 and U.S. Design Pat. No. D493,300, issued Jul. 27, 2004.

DISCLOSURE OF INVENTION

The device of the present invention is characterized by its relative simplicity, low cost and ease of use. The device affords protection for the recorded side of an optical disc and is compact in nature. The device lends itself to being held by a single hand of a user and use of a single hand to effect separation of the disc and cover when one wishes to use the disc.

The disc and device can be readily stored in existing sleeves and storage devices currently on the market. The outside of the disc cover and the label of the disc can be utilized for labeling or advertising. With the disc in place in the device, the disc can be handled without touching or damaging the recorded side thereof. The device is extremely easy to use compared to many arrangements currently known or available.

The device of the invention is for releasably holding an optical disc having two disc sides, an outer disc rim and a central disc opening and for substantially covering one of the disc sides while leaving the other of the disc sides uncovered.

The device includes a double-sided, plate-like cover and disc retainer structure projecting outwardly from one side of the cover for entering the central disc opening of an optical disc and frictionally engage the optical disc to provide a releasable connection between the optical disc and the device.

The cover has opposed, spaced, inwardly extending notches disposed on opposite sides of the disc retainer structure exposing spaced areas of the optical disc extending inwardly from the outer disc rim of an optical disc held thereby to allow manual engagement of the rim to separate the device and the optical disc upon manual application of a pushing force on the disc retainer structure while simultaneously manually engaging the outer disc rim at the locations of the notches.

Other features, advantages and objects of the present invention will become apparent with reference to the following description and accompanying drawings.

BRIEF DESCRIPTION OF DRAWINGS

FIG. 1 is a top, perspective view of a preferred form of device constructed in accordance with the teachings of the present invention;

FIG. 2 is a top, plan view of the device;

FIG. 3 is a bottom, perspective view of the device;

FIG. 4 is a side, elevation view of the device;

FIG. 5 is a front elevation view of the device;

BEST MODE FOR CARRYING OUT THE INVENTION

Figure 6:
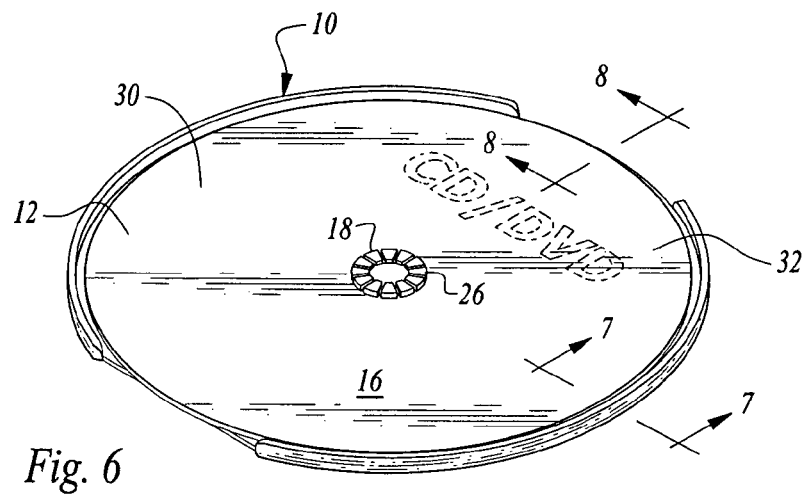
FIG. 6 is a top, perspective view of the device holding an optical disc.
Figure 7:
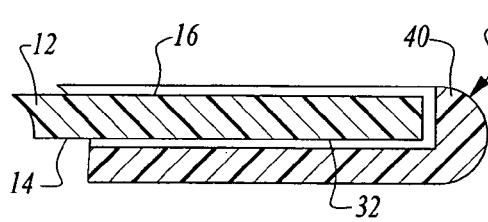
FIG. 7 is a greatly enlarged, cross-sectional view taken along line 7-7 of FIG. 6.
Figure 8:
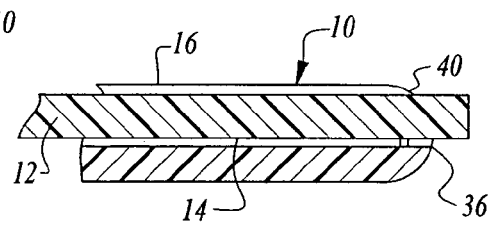
FIG. 8 is a greatly enlarged, cross-sectional view taken along line 8-8 of FIG. 6.

Referring now to the drawings, a device constructed in accordance with the teachings of the present invention is designated by reference numeral 10. The device is for releasably holding an optical disc 12, such as a CD or DVD, of conventional construction and having a recorded side 14 and a label side 16. The disc also has an outer disc rim and a central disc opening 18.

The device 10 is for substantially covering one of the disc sides, in particular the recorded side 14, and leaving the other of the disc sides, the label side 16, wholly uncovered. The device includes a double-sided, plate-like cover 24 and disc retainer structure 26 projecting outwardly from one side of the cover for entering the central disc opening of the optical disc and frictionally engaging the optical disc to provide a releasable connection between the optical disc and the device. The disc retainer structure 26 illustrated is of conventional structure, comprising a plurality of flexible fingers or members 28.

The device 10 preferably is of integral construction, and formed of molded plastic material of any suitable type.

The cover has cover segment portions 30, 32 with outer peripheral edges extending along spaced portions of the outer disc rim of optical disc 12 when the optical disc is releasably connected to the cover. The cover defines spaced, inwardly extending notches 36 between the cover segment portions exposing spaced areas of the optical disc extending inwardly from the outer disc rim to allow manual engagement of the rim when separating the device and optical disc. In the illustrated embodiment, the notches are defined by straight edges of the cover; however, the notches could be of different shapes, for example, defined by inwardly curving cover edges.

Flange segments 40 extend outwardly from the outer peripheral edges of the cover segment portions in the direction the disc retainer structure 26 projects outwardly from the cover. Flange segments 40 partially surround and are spaced from the disc retainer structure. The flange segments terminate at or adjacent to the notches. The flange segments extend along separate, spaced arcs of a circle, and in the arrangement illustrated, the flange segments extend outwardly a distance slightly beyond an optical disc held by the device. This feature and the fact that the device outer periphery is rounded at the locations of the flange segments facilitate the placement of the device and any disc held thereby into a standard CD or DVD retention sleeve if desired.

The notches 36 are disposed along an imaginary straight line bisecting the cover. The notches are located on opposite sides of and spaced from the disc retainer structure 26, the disc retainer structure also being disposed along the imaginary straight line bisecting the cover.

Figure 9:
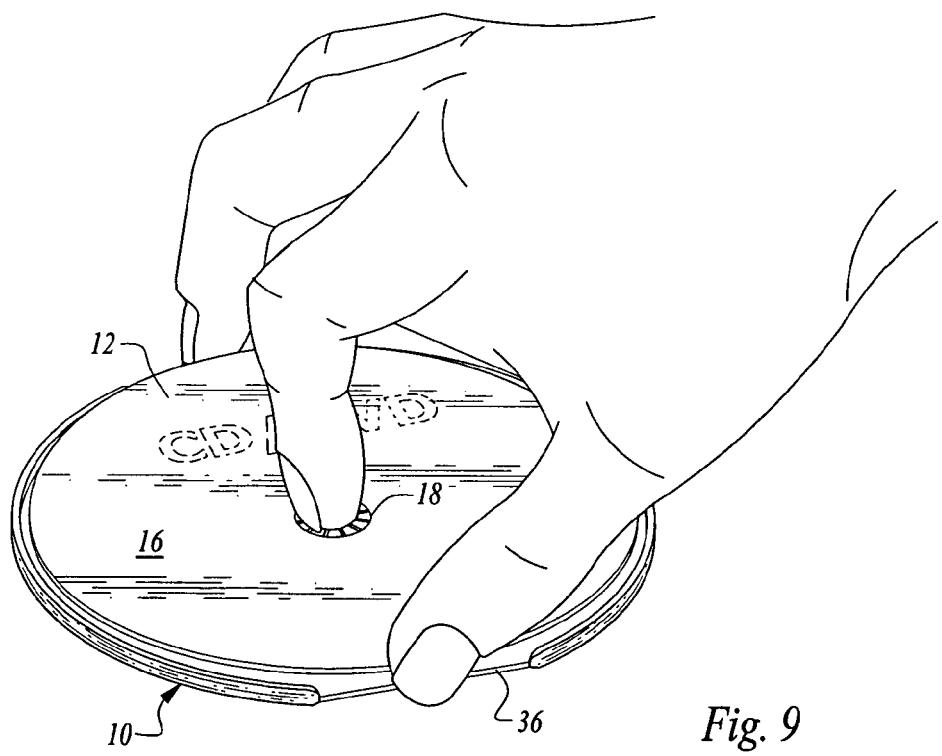
FIG. 9 illustrates the disc and holder being held by one hand and being manipulated by that hand to separate the device from the disc.

FIG. 9 shows how the single hand of a user is employed to separate the disc and device. The illustration shows the user holding the exposed outer rim of the disc 12 at two locations with thumb and middle finger, keeping the cover and recorded disc side facing downwardly, the label side up, and the cover 24 under the optical disc. The notches enable the user to hold the disc without engaging and supporting the device with the thumb and middle finger. The user then presses the flexible members or fingers 28 of the disc retainer structure with the index finger. Continued pushing of the disc retainer structure causes it to exit the central disc opening 18 and the otherwise unsupported device to fall away from the optical disc held by its outer rim, revealing and uncovering the recorded side 14, the disc being in position for insertion into any CD/DVD player.

According to the method of the invention, the optical disc is positioned in a device including a plate-like cover having spaced, opposed notches and disc retainer structure projecting from the cover and disposed between the notches.

The disc retainer structure is utilized to releasably connect the optical disc to the device with the cover covering substantially all of a first disc side but with a second disc side remaining completely uncovered along with spaced areas of the first disc side extending inwardly from the outer disc rim at the locations of the notches whereby the outer disc rim is manually accessible by a user at the locations of the notches, and the disc retainer structure extending through the central disc opening.

The next step is the manual manipulation of the device and releasably connected optical disc so that the uncovered second disc side faces upwardly and the cover is under the optical disc. While the second disc side faces upwardly and while the cover is under the optical disc, the outer disc rim is grasped at the locations of the notches.

While manually grasping the outer disc rim at the locations of the notches the user manually pushes against the disc retainer structure to push the disc retainer structure out of the central disc opening to separate the device from the optical disc.

The invention claimed is:

1. A device of single-piece, molded plastic construction for releasably holding an optical disc having two disc sides, an outer circular-shaped disc rim and a central disc opening and for substantially covering one of said disc sides while leaving the other of said disc sides uncovered, said device comprising a double-sided, plate-like cover and disc retainer structure projecting outwardly from one side of said cover for entering the central disc opening of an optical disc and frictionally engage said optical disc to provide a releasable connection between said optical disc and said device, said cover having cover segment portions with outer peripheral edges extending along spaced portions of the outer disc rim of said optical disc when said optical disc is releasably connected to said cover, and said cover defining spaced, inwardly extending notches between said cover segment portions exposing spaced areas of said optical disc extending inwardly from said outer disc rim to allow manual engagement of said rim when separating the device and the optical disc, and flange segments of substantially uniform height and thickness extending outwardly from the outer peripheral edges of said cover segment portions in the direction said disc retainer structure projects outwardly from said cover, said flange segments partially surrounding and spaced from said movable disc retainer structure, said flange segments terminating at said notches and extending along separate spaced arcs of a circle larger than said outer circular-shaped disc rim whereby said flange segments are immediately adjacent to but spaced from the outer circular-shaped disc rim when the optical disc is releasably connected to said cover, said flange segments extending outwardly a distance slightly greater than the thickness of said optical disc, the outer periphery of said device being rounded at the locations of said flange segments, and said flange segments being free of outwardly extending projections or other structure to facilitate the placement of said device and any optical disc held thereby into a retention sleeve, said disc retainer structure including at least one flexible retention member manually engageable by a user simultaneously with manual engagement of the outer disc rim by the user at the location of said two notches to simultaneously apply with a single hand a pushing force on said at least one flexible member and a force on the outer circular-shaped disc rim at both of said locations opposed to said pushing force to cause separation of the device from the optical disc while retaining the optical disc in hand.

2. The device according to claim 1 wherein two of said notches are disposed along an imaginary straight line bisecting said cover.

3. The device according to claim 2 wherein said two notches disposed along said imaginary straight line bisecting said cover are located on opposite sides of and spaced from said disc retainer structure, said disc retainer structure also disposed along the said imaginary straight line bisecting said cover.

4. The device according to claim 1 wherein said cover is transparent whereby the disc side covered by the cover can be observed from a location externally of said cover.

* * * * *